US006536908B2

(12) United States Patent
Shuen

(10) Patent No.: US 6,536,908 B2
(45) Date of Patent: Mar. 25, 2003

(54) CAR REARVIEW MIRROR STRUCTURE

(75) Inventor: Shun-Tian Shuen, San Chung (TW)

(73) Assignee: Janchy Enterprise Co., Ltd., Taipei (TW)

( * ) Notice: Subject to any disclaimer, the term of this patent is extended or adjusted under 35 U.S.C. 154(b) by 0 days.

(21) Appl. No.: 09/884,045

(22) Filed: Jun. 20, 2001

(65) Prior Publication Data

US 2002/0196565 A1 Dec. 26, 2002

(51) Int. Cl.⁷ .............................. G02B 5/08; G02B 7/182
(52) U.S. Cl. ................... 359/850; 359/549; 359/872
(58) Field of Search .................... 359/850, 855, 359/864, 865, 866, 872, 549

(56) References Cited

U.S. PATENT DOCUMENTS

| 4,906,088 A | * | 3/1990 | Casey ........................ 359/865 |
| 5,165,081 A | * | 11/1992 | Drumheller ................ 248/478 |
| 5,198,938 A | * | 3/1993 | Ward ....................... 248/475.1 |

* cited by examiner

*Primary Examiner*—Mark A. Robinson
(74) *Attorney, Agent, or Firm*—Bacon & Thomas, PLLC

(57) ABSTRACT

A car rearview mirror structure. A surface of the auxiliary mirror seat plate includes multiple longitudinal and transverse intersecting division lines, such that the auxiliary mirror seat plate can be bent at different angles to snugly attach to an outer periphery of a rearview mirror seat. An auxiliary mirror is attached to the auxiliary mirror seat.

1 Claim, 9 Drawing Sheets

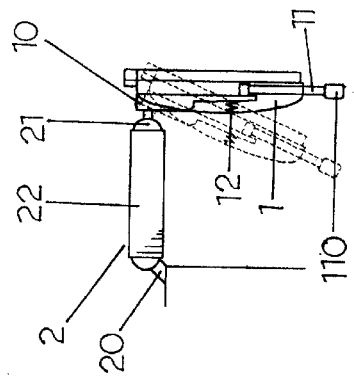
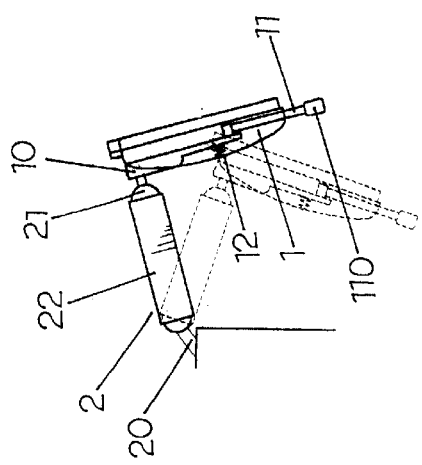
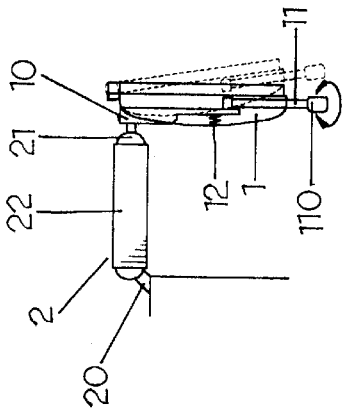
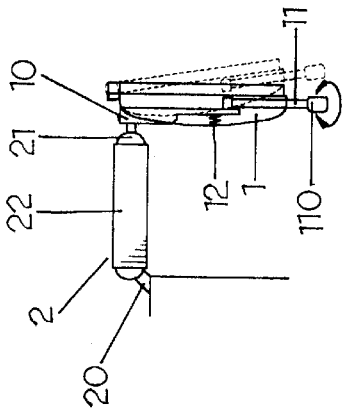
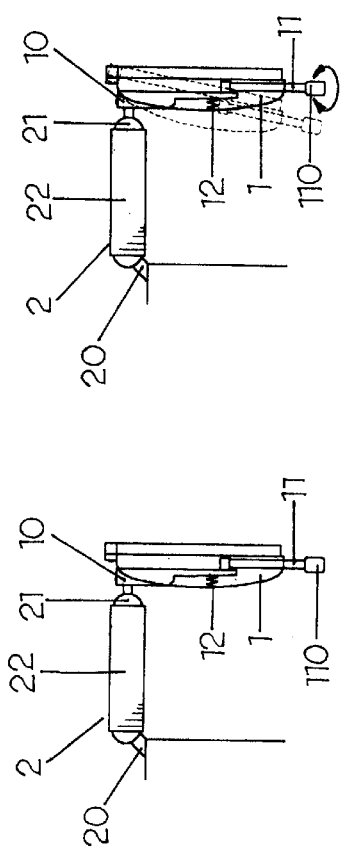

CAR REARVIEW MIRROR STRUCTURE

BACKGROUND OF THE INVENTION

The present invention is related to an improved car rearview mirror structure in which the adjustment bar is used to micro-adjust the elevation or depression angle of the mirror seat. An anti-collision warning device is provided and auxiliary mirrors are added to the rearview mirror so that the rearward sight is wider and clearer and the rearview mirror is beautified.

The rearview mirror of a car helps a driver to see and control the state of rear side and approaching cars on left and right sides so as to ensure safety in driving. A general rearview mirror is formed by a mirror seat, a mirror face and a fixing support lever. The mirror face is inlaid and fixed in the mirror seat. The center of the back face of the mirror seat is formed with a circular hole in which a ball body is inlaid. The ball body is adjustably connected with the fixing lever extending from the roof of the car, whereby a driver can adjust the rearview mirror to an optimal position to see and control the state of rearward cars and ensure safety.

However, the above rearview mirror is not equipped with any auxiliary mirror so that the rearward sight is limited and dead corners exist. This often leads to accidents. Moreover, the conventional rearview mirror lacks any micro-adjustment lever for micro-adjust the mirror face or mirror seat. Therefore, a driver can hardly accurately and quickly adjust the rearview mirror. This is inconvenient to the user. In addition, the conventional rearview mirror has monotonous appearance and it is impossible to add any decoration on the rearview mirror to beautify the appearance and highlight personal style. When passing by the cars running on the other way at night, the dim light often makes a driver fail to truly control the distance between the passing by cars. This is dangerous. Moreover, the rearview mirrors on two sides of the car are not equipped with any rain shield so that the rain water tends to attach to the rearview mirror and affect the sight.

SUMMARY OF THE INVENTION

It is therefore a primary object of the present invention to provide an improved car rearview mirror structure which has wider and clearer rearward sight and beautified appearance.

The present invention can be best understood through the following description and accompanying drawings wherein:

BRIEF DESCRIPTION OF THE DRAWINGS

FIG. 4A shows the adjustment of the front ball rod of the present invention;

FIG. 4B shows the adjustment of the rear ball rod of the resent invention;

FIG. 4C shows that the arched mirror seat of the present invention is not yet micro-adjusted;

FIG. 4D shows that the depression angle of the arched mirror seat of the present invention is micro-adjusted;

FIG. 4E shows that the elevation angle of the arched mirror seat of the present invention is micro-adjusted;

DETAILED DESCRIPTION OF THE PREFERRED EMBODIMENTS

Figure 1:
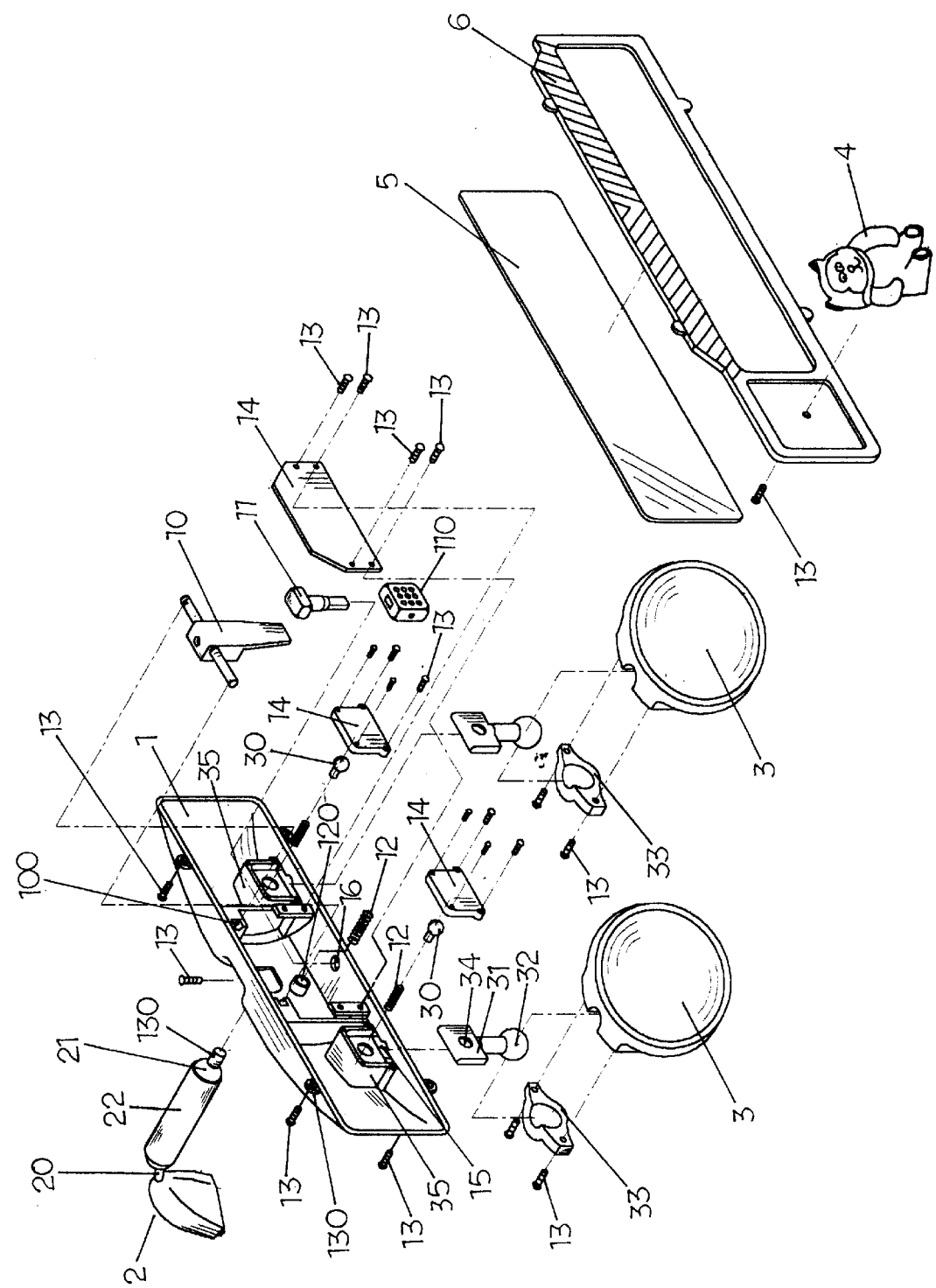
FIG. 1 is a perspective exploded view of the present invention.
Figure 2:
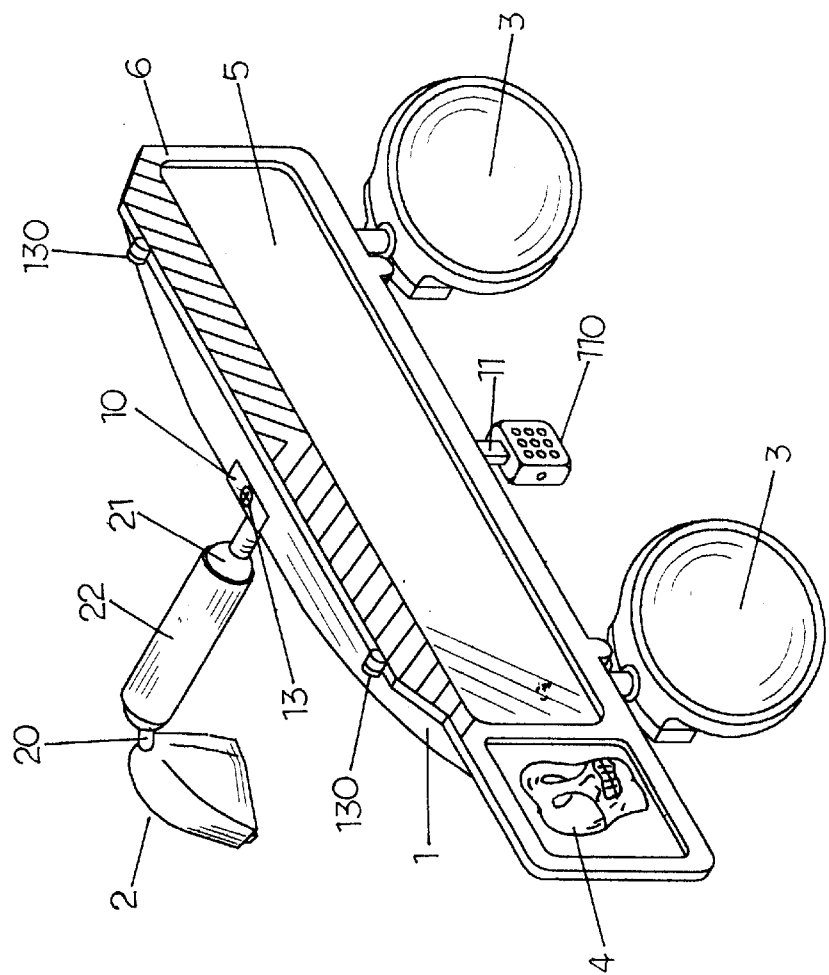
FIG. 2 is a perspective assembled view of the present invention.

Please refer to FIGS. 1 and 2. The car rearview mirror structure of the present invention includes an arched mirror seat 1, an I-shaped adjustment bar 11, a T-shaped bracket 10, a fixing support lever 2, auxiliary mirrors 3, decorative outer frame 6, auxiliary mirror seat places 7 and anti-collision warning device 9. The arched mirror seat 1 is a flat rectangular and arched hollow shade body. The inner side thereof is provided with opposite insertion seats 35 having insertion channels 15. A spring 12 and a locating steel ball 30 are disposed in the insertion seat 35. A cover plate 14 is locked on the insertion seat 35 to fix the spring and steel ball therein. The auxiliary mirrors 3 are inserted in the insertion seats. The upper side of the ball rod 32 is provided with an insertion plate 31 locked on the auxiliary mirror 3 by a cover plate 33 and locking screw 13. The T-shaped bracket cavities 100 cooperate with two shafts of the T-shaped bracket 10. The front side of the T-shaped bracket 10 is provided with a restoring spring 12 and spring socket 120 for providing reaction force when micro-adjusting the mirror seat 1. The cover plate 14 is disposed on rear side of the T-shaped bracket 10. The locking screws 13 are locked on the arched mirror seat 1 to prevent the T-shaped bracket 10 from bounding out. The lower side is formed with a circular hole 16 through which the I-shaped adjustment bar 11 is passed. A pattern adjustment handle 110 is inserted on the I-shaped adjustment bar 11 for micro-adjusting the elevation or depression angle of the mirror seat 1. Four sides of the arched mirror seat 1 are provided with opposite thread holes 130 for locking the outer frame 6 thereon. The front and rear ball rods 20, 21 of the fixing support lever 2 can be both 360 degrees rotated. One end of the rear ball rod 21 is formed with a thread hole 130. A locking screw 13 is screwed into the thread hole 130 to lock with the T-shaped bracket 10. The other end is provided with a ball body inlaid in one end of the link 22. One end of the front ball rod 20 is provided with a ball body inlaid in the other end of the link 22 for rotation and adjustment of the angle.

Figure 3:
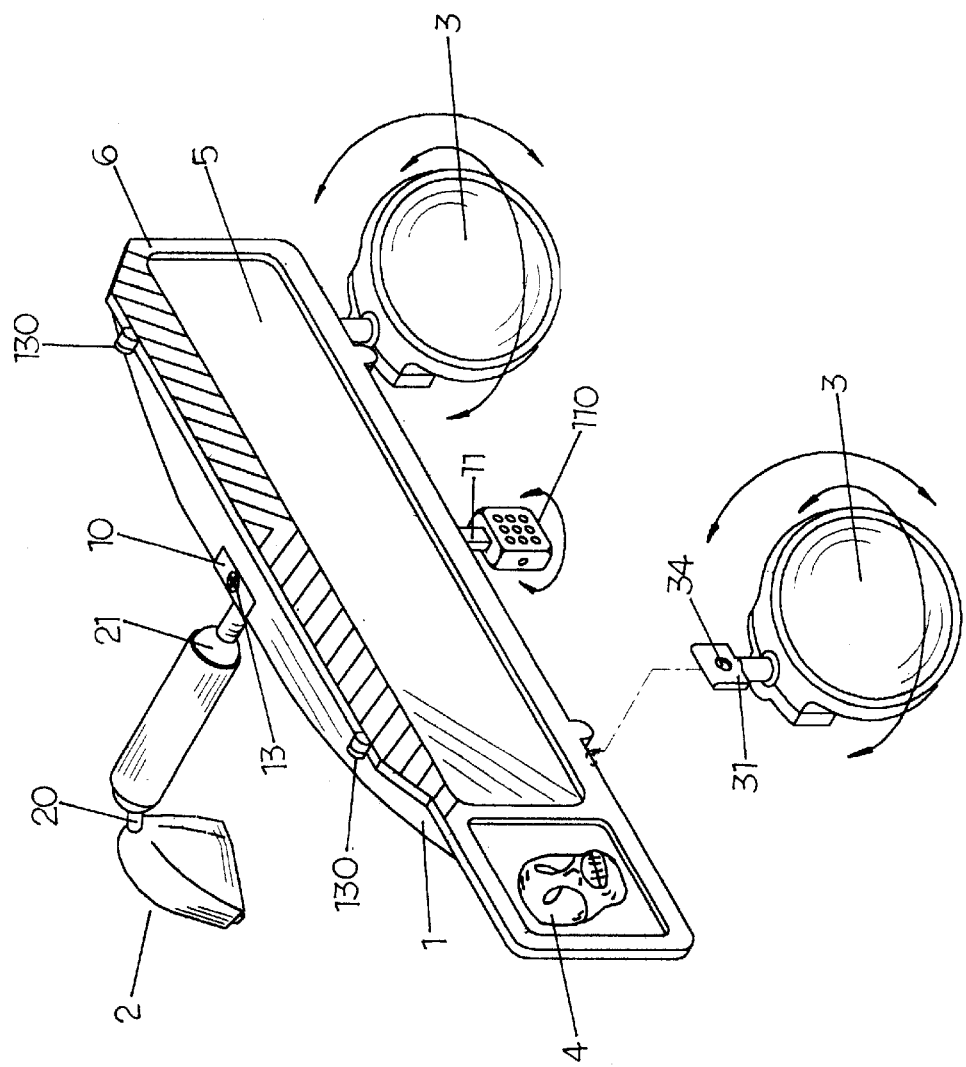
FIG. 3 shows the application of the present invention.

In actual use, referring to FIGS. 3, 4A and 4B, when micro-adjusting the angle of the arched mirror seat 1, a user only needs to left or right turn the pattern adjustment handle 110. At this time, the I-shaped adjustment bar 11 will act on the T-shaped bracket 10 to micro-adjust the elevation angle or depression angle. When the driver desires to add the auxiliary mirror 3 to the rearview mirror, the insertion plate 31 on upper side of the auxiliary mirror 3 is first inserted into the insertion channel 15 of the insertion seat 35 of the arched mirror seat 1. The insertion plate 31 is formed with a central circular hole 34 which cooperates with the locating steel ball 30 of the insertion seat 35 to achieve a locating effect. Two sides of a lateral end of the insertion plate 31 and the inner side of front end of the circular hole 34 have an inward converged inclination angle to facilitate installation and detachment of the auxiliary mirror 3. When adjusting the auxiliary mirror 3, the user only needs to directly turn and shift the main body of the auxiliary mirror 3. By means of the ball rod 32 connected to lower side of the insertion plate 31, the auxiliary mirror 3 can be rotated by various angles and located.

Figure 5:
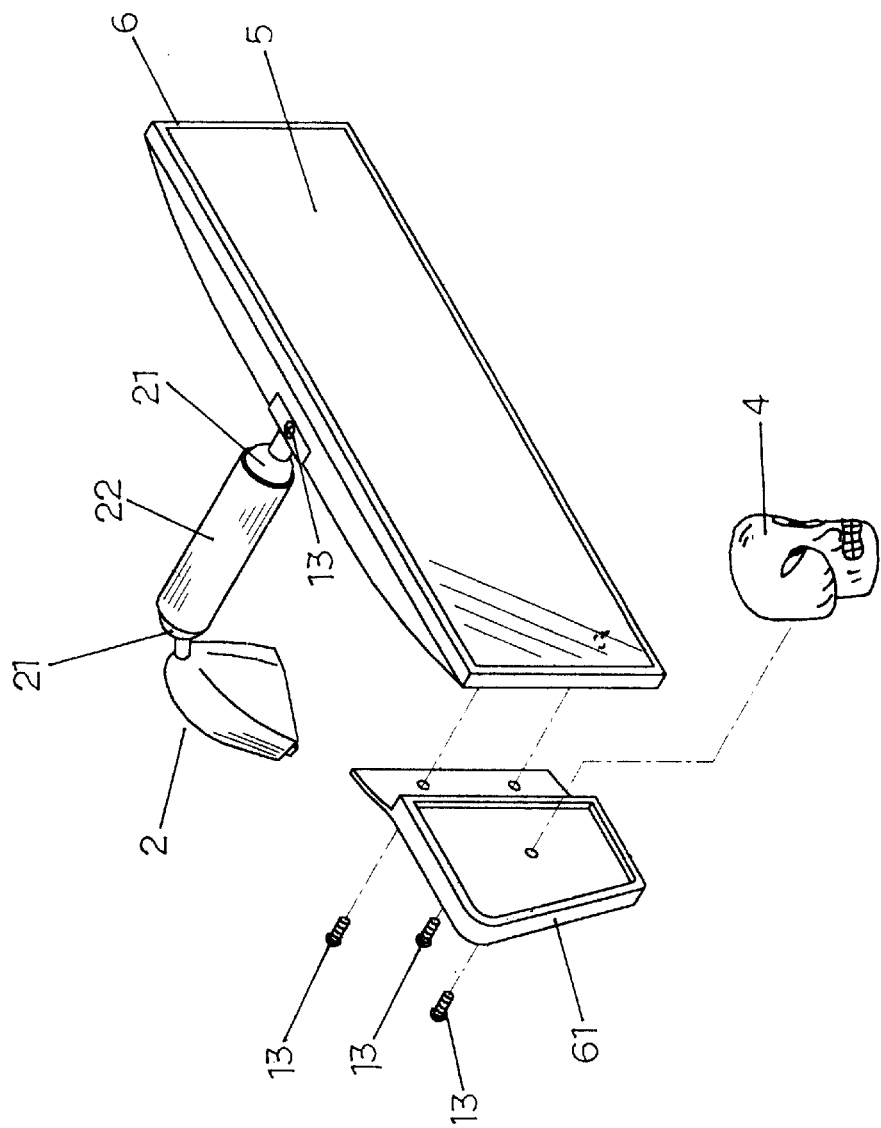
FIG. 5 shows another application of the present invention.

Referring to FIG. 5, the decorative outer frame 61 is added to lateral side of the conventional outer frame 6. When mounting the decoration 4 on the decorative outer frame 61, a desired decoration 4 is locked on the decorative outer frame 61 by locking screws 13. The decorative outer frame 61 and the decoration 4 are replaceable according to personal favor.

Figure 6:
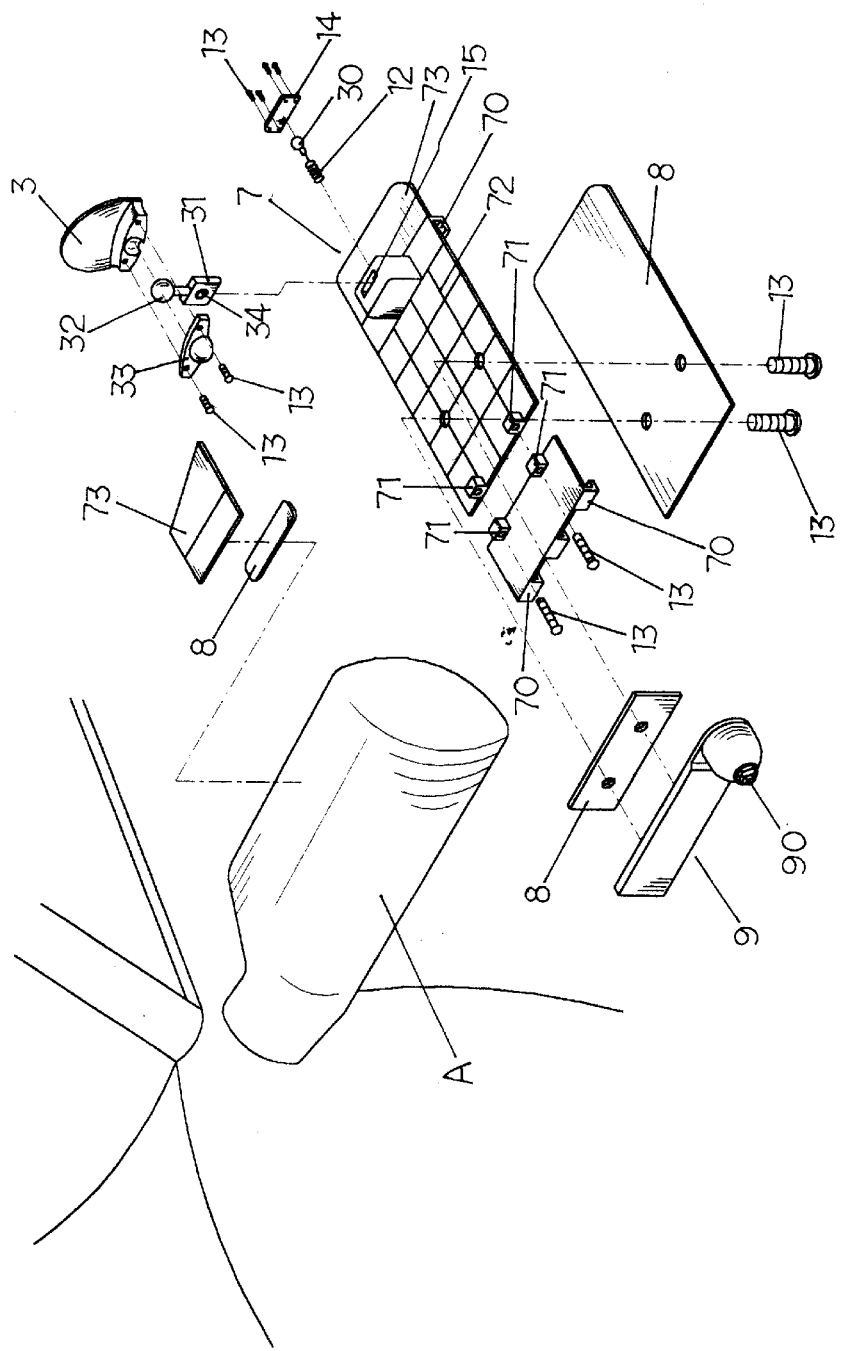
FIG. 6 is a perspective exploded view of another embodiment of the present invention.
Figure 7:
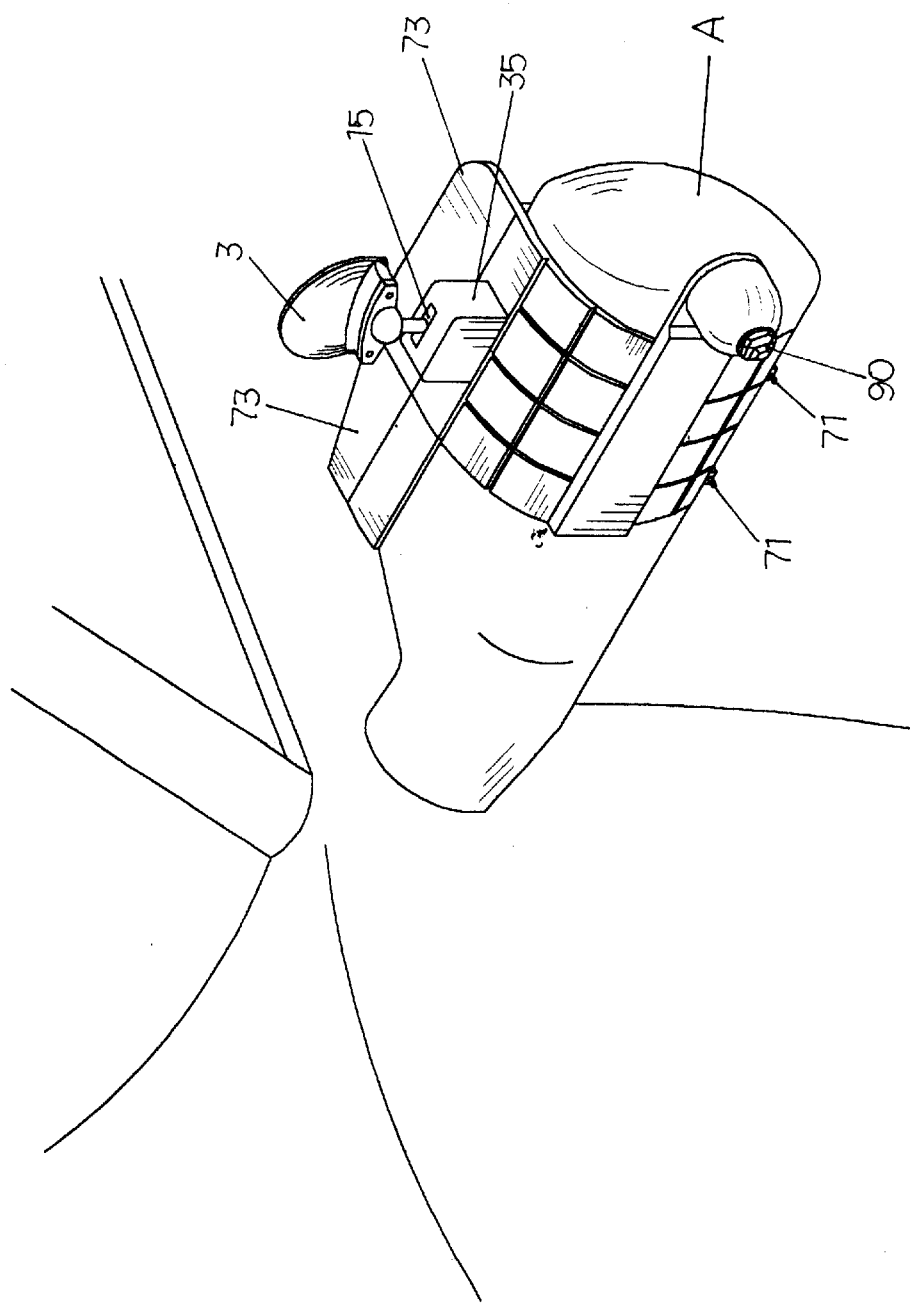
FIG. 7 is a perspective assembled view of the embodiment of FIG. 6 of the present invention.

Referring to FIGS. 6 and 7, the color of the auxiliary mirror seat plate 7 can be changed. The surface thereof is formed with multiple longitudinal and traverse intersecting division lines 72, whereby the seat plate 7 can be bent by different angles to snugly attach to the outer periphery of the rearview mirror seat A. The upper edge of the front auxiliary mirror seat plate 7 is provided with an insertion seat 35 near front end thereof. The insertion seat 35 has an insertion channel 15 in which the insertion plate 31 of the auxiliary mirror 3 is inserted. A rain shield plate 73 is disposed at a front end and on a lateral side of the insertion seat 35 to prevent the rain water from blurring the rearview mirror and ensure safety in driving. In addition, multiple pairs of hanging hooks 70 are disposed near lower edges of front and rear ends of the auxiliary mirror seat plate 7 for hooking the upper and lower edges of the rearview mirror seat A and cooperating with the fastening joint 71 on upper edge of the connecting sections of the front and rear auxiliary mirror seat plate 7 and being tensioned and fastened by the locking screw 13 and the inner thread. By means of double-face adhesive tape 8, the seat plate 7 is fixedly adhered to the outer periphery of the rearview mirror seat 10. In addition, the anti-collision warning device 9 is a rectangular body having a polygonal reflective crystal 90. When passing by the cars running on the other way at night, the light beam coming from the headlight of the car coming from the opposite side will be reflected so that the driver can control the proper distance between the passing by cars and ensure safety. The back face of the warning device is formed with opposite thread holes. By means of double-face adhesive tape 8 and locking screws 13, the warning device can be locked on the rearview mirror seat A.

Figure 8:
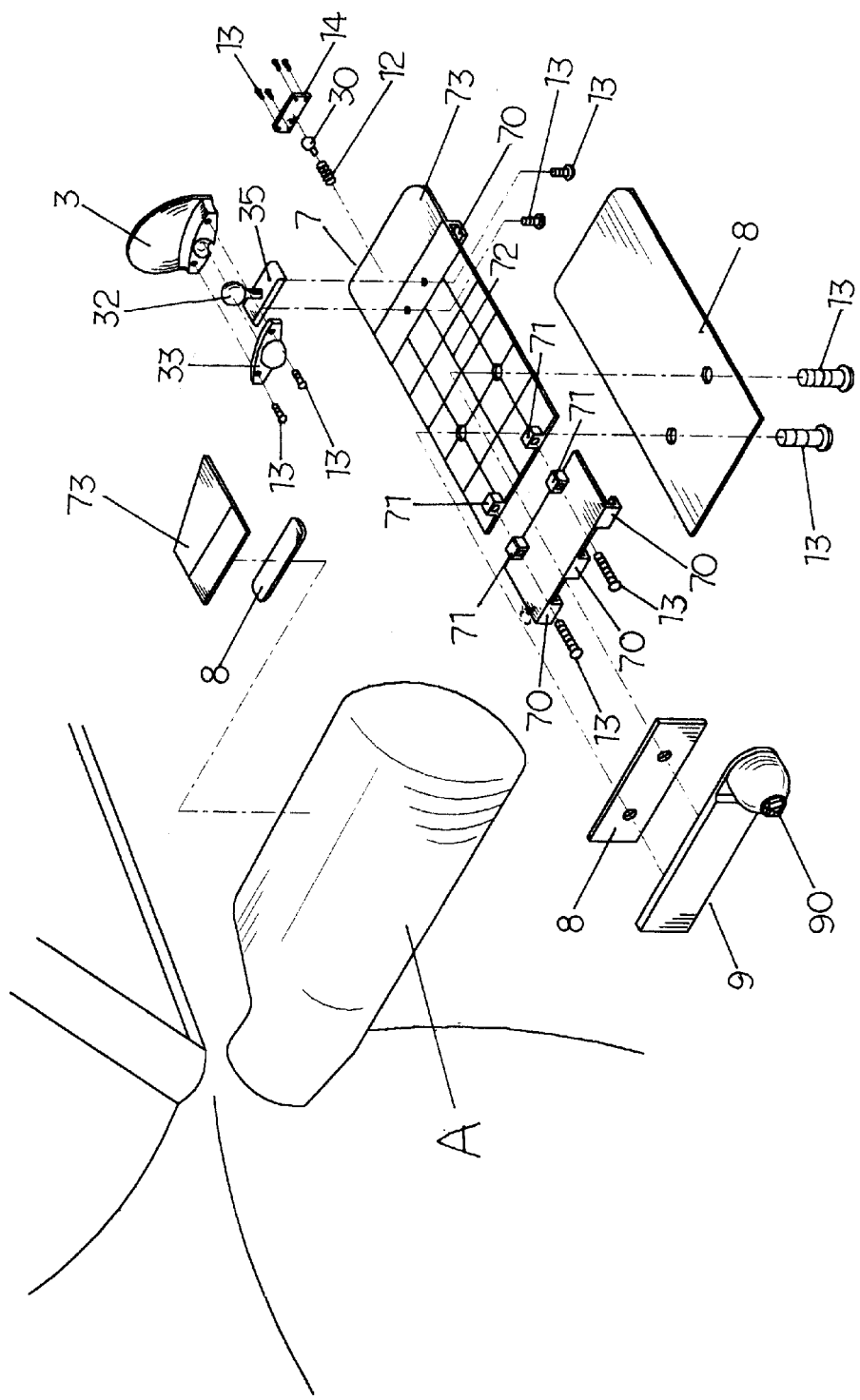
FIG. 8 is a perspective exploded view of still another embodiment of the present invention.
Figure 9:
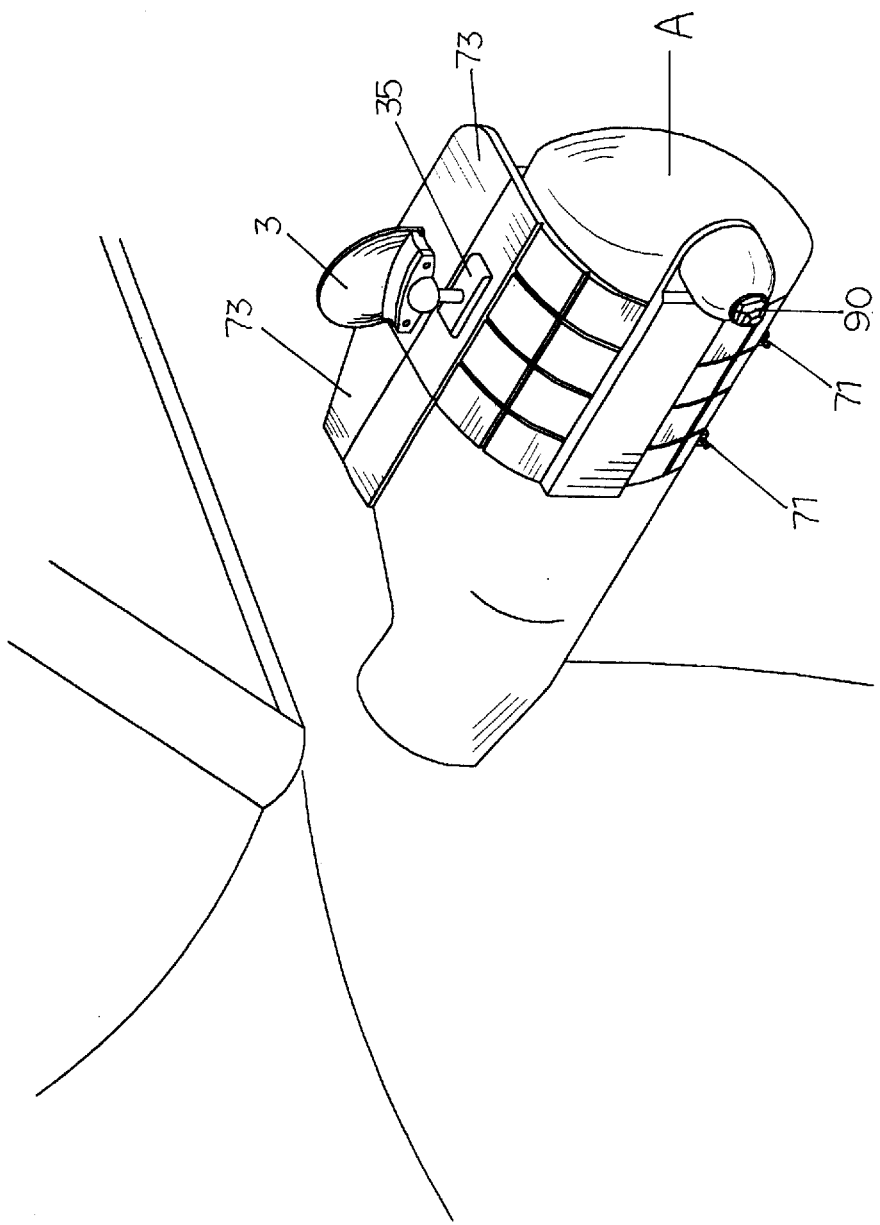
FIG. 9 is a perspective assembled view of the embodiment of FIG. 8 of the present invention.

FIGS. 8 and 9 show another embodiment of the present invention, in which the insertion seat 35 of the auxiliary mirror 3 is directly locked on the auxiliary mirror seat plate 7 by locking screws 13, whereby the rearward sight can be widened.

The above embodiments are only used to illustrate the present invention, not intended to limit the scope thereof. Many modifications of the above embodiments can be made without departing from the spirit of the present invention.

What is claimed is:

1. A car rearview mirror structure in which the color of an auxiliary mirror seat plate is changeable, a surface thereof being formed with multiple longitudinal and transverse intersecting division lines, whereby the auxiliary mirror seat plate can be bent by different angles to snugly attach to an outer periphery of a rearview mirror seat, an upper edge of the auxiliary mirror seat plate being provided with an insertion seat near a front end thereof, the insertion seat having an insertion channel in which an insertion plate of an auxiliary mirror is inserted, a rain shield plate being disposed at a front end and on a lateral side of the insertion seat to prevent the rain water from blurring the rearview mirror, multiple pairs of hanging hooks being disposed near lower edges of front and rear ends of the auxiliary mirror seat plate and adapted for hooking upper and lower edges of the rearview mirror seat and cooperating with a fastening joint on upper edge of connecting sections of the rear auxiliary mirror seat plate and being tensioned and fastened by a locking screw, by means of double-face adhesive tape, the auxiliary mirror seat plate being fixedly adhered to the outer periphery of the rearview mirror seat, and an anti-collision warning device having reflective crystal being disposed on the auxiliary mirror seat plate.

* * * * *